(12) United States Patent
Kim

(10) Patent No.: US 9,126,115 B2
(45) Date of Patent: *Sep. 8, 2015

(54) SAFETY SCHEME FOR GESTURE-BASED GAME SYSTEM

(71) Applicant: Empire Technology Development LLC, Wilmington, DE (US)

(72) Inventor: Seungil Kim, Seoul (KR)

(73) Assignee: Empire Technology Development LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/150,143

(22) Filed: Jan. 8, 2014

(65) Prior Publication Data

US 2014/0141882 A1 May 22, 2014

Related U.S. Application Data

(63) Continuation of application No. 13/700,968, filed as application No. PCT/KR2011/009324 on Dec. 2, 2011, now Pat. No. 8,657,681.

(51) Int. Cl.
*A63F 9/24* (2006.01)
*A63F 13/40* (2014.01)
*A63F 13/20* (2014.01)

(52) U.S. Cl.
CPC .................. *A63F 13/10* (2013.01); *A63F 13/06* (2013.01); *A63F 2300/1087* (2013.01); *A63F 2300/306* (2013.01); *A63F 2300/69* (2013.01)

(58) Field of Classification Search
CPC ....................................................... A63F 13/12
USPC ................................................ 463/31–33, 42
See application file for complete search history.

(56) References Cited

U.S. PATENT DOCUMENTS

| | | | |
|---|---|---|---|
| 5,900,849 A | 5/1999 | Gallery | |
| 6,663,491 B2 | 12/2003 | Watabe et al. | |
| 6,738,066 B1 | 5/2004 | Nguyen | |
| 7,489,265 B2 | 2/2009 | Egri et al. | |
| 7,636,645 B1 | 12/2009 | Yen et al. | |
| 7,702,608 B1 | 4/2010 | Bererton et al. | |
| RE41,414 E | 7/2010 | Yamamoto | |
| 8,162,754 B2 | 4/2012 | Asami | |

(Continued)

FOREIGN PATENT DOCUMENTS

| | | | |
|---|---|---|---|
| CN | 101380520 A | 3/2009 | |
| CN | 101505841 A | 8/2009 | |

(Continued)

OTHER PUBLICATIONS

International Search Report and Written Opinion issued in application No. PCT/US2012/026515 on May 31, 2012.

(Continued)

*Primary Examiner* — Omkar Deodhar
(74) *Attorney, Agent, or Firm* — Brundidge & Stanger, P.C.

(57) ABSTRACT

Technologies are generally described for a safety scheme for a gesture-based game. In some examples, a method performed under control of a gesture-based game system may include determining whether an obstacle exists within a playing space associated with a game being currently played on the gesture-based game system, and generating in a display area associated with the game a barrier image associated with the obstacle.

15 Claims, 6 Drawing Sheets

(56) References Cited

U.S. PATENT DOCUMENTS

| | | | |
|---|---|---|---|
| 9,020,239 B2 | 4/2015 | Graepel et al. | |
| 2007/0110298 A1 | 5/2007 | Graepel et al. | |
| 2008/0207308 A1 | 8/2008 | Yoshizawa | |
| 2008/0300055 A1 | 12/2008 | Lutnick et al. | |
| 2009/0027337 A1 | 1/2009 | Hildreth | |
| 2009/0077504 A1 | 3/2009 | Bell et al. | |
| 2009/0221368 A1 | 9/2009 | Yen et al. | |
| 2009/0221374 A1* | 9/2009 | Yen et al. | 463/42 |
| 2010/0148977 A1 | 6/2010 | Tseng et al. | |
| 2010/0210359 A1 | 8/2010 | Krzeslo et al. | |
| 2010/0234094 A1 | 9/2010 | Gagner et al. | |
| 2010/0277411 A1 | 11/2010 | Yee et al. | |
| 2010/0306712 A1 | 12/2010 | Snook et al. | |
| 2011/0080490 A1 | 4/2011 | Clarkson et al. | |
| 2011/0119640 A1 | 5/2011 | Berkes et al. | |
| 2011/0185309 A1 | 7/2011 | Challinor et al. | |
| 2011/0190061 A1 | 8/2011 | Takeda et al. | |
| 2011/0193939 A1 | 8/2011 | Vassigh et al. | |
| 2011/0230263 A1* | 9/2011 | Ng | 463/31 |
| 2011/0300929 A1 | 12/2011 | Tardif et al. | |
| 2012/0122574 A1 | 5/2012 | Fitzpatrick et al. | |
| 2013/0260864 A1 | 10/2013 | Gomez et al. | |
| 2013/0293586 A1 | 11/2013 | Kaimo et al. | |

FOREIGN PATENT DOCUMENTS

| | | |
|---|---|---|
| JP | H10504917 A | 5/1998 |
| JP | H11300049 A | 11/1999 |
| JP | 2001299975 A | 10/2001 |
| JP | 2006194887 A | 7/2006 |
| JP | 2006344199 A | 12/2006 |
| JP | 2008178597 A | 8/2008 |
| JP | 2009061180 A | 3/2009 |
| JP | 2010035741 A | 2/2010 |
| JP | 2010-137097 A | 6/2010 |
| JP | 2010257461 A | 11/2010 |
| JP | 2010258774 A | 11/2010 |
| JP | 2010534895 A | 11/2010 |
| JP | 2011-189066 A | 9/2011 |
| JP | 2012155654 A | 8/2012 |
| KR | 1020010095900 A | 11/2001 |
| KR | 10-2005-0047024 | 5/2005 |
| KR | 10-2007-0032842 | 4/2007 |
| KR | 1020080069601 A | 7/2008 |
| KR | 10-2009-0090980 | 9/2009 |
| KR | 10-2010-0032699 | 4/2010 |
| KR | 1020110047776 A | 5/2011 |

OTHER PUBLICATIONS

International Search Report and Written Opinion issued in application No. PCT/KR11/006430 on Apr. 30, 2012.
International Search Report and Written Opinion issued in application No. PCT/KR11/004855 on Apr. 4, 2012.
International Search Report and Written Opinion issued in application No. PCT/KR11/009234 on Aug. 31, 2012.
http://www.dooyoo.co.uk/playstation-2-game/eyetoy-play-camera/1017264/ (2012).
Bee, J., "kinect fail," accessed at https://www.youtube.com/watch?v=qafmCU4LUZ8&feature=player_embedded, last Uploaded on Nov. 7, 2010, pp. 1-2.

* cited by examiner (A)

(B)

SAFETY SCHEME FOR GESTURE-BASED GAME SYSTEM

CROSS-REFERENCE TO RELATED APPLICATION

The present application is a Continuation filing under 35 USC §120 of U.S. application Ser. No. 13/700,968, filed Nov. 29, 2012, now U.S. Pat. No. 8,657,681, which is a National Stage Entry under 35 U.S.C. §371 of International application number PCT/KR11/09324, filed Dec. 2, 2011, the disclosures of which are hereby incorporated by reference in their entirety.

BACKGROUND

Camera technology and gesture recognition technology have experienced phenomenal growth in the last few years. Game devices have adopted such technologies. For example, a game device may utilize a camera to capture and recognize a gesture of a player and use the recognized gesture of the player as an input signal for playing a game. Game software developers have developed various types of gesture-based games for such game devices. Such gesture-based games may require an enough playing space within which the players may make broad bodily movements, i.e., gestures. The playing space may need to be obstacle-free so as to ensure a safe gaming experience for the players and thus, the gesture-based games may instruct the players to move any obstacles located within the playing space before starting the game. However, when an obstacle, which is immovable or difficult to move, is located within the playing space, the players may not be able to start the playing of the game due to the obstacle.

SUMMARY

In an example, a method performed under control of a gesture-based game system may include determining whether an obstacle exists within a playing space associated with a game being currently played on the gesture-based game system; and generating in a display area associated with the game a barrier image associated with the obstacle.

In another example, a gesture-based game system may include a location determination unit configured to obtain player location information of a player and obstacle location information of an obstacle in a playing space during a playing of a game using the gesture-based game system; a distance determination unit configured to determine a distance between the player and the obstacle based at least in part on the player location information and the obstacle location information; a virtual distance determination unit configured to determine in a display area a virtual distance between an avatar image associated with the player and a barrier image associated with the obstacle based at least in part on the determined distance; and an image generation unit configured to generate in the display area the avatar image and the barrier image, separated from each other by the virtual distance.

In yet another example, a computer-readable storage medium may have stored thereon computer-executable instructions that, in response to execution, cause a gesture-based game system to perform operations, including determining a distance between a player of a game and an obstacle in the proximity of the player in a playing space; comparing in a display area a virtual distance between an avatar image corresponding to the player and a barrier image corresponding to the obstacle with a predetermined distance limit; generating in the display area the avatar image; and generating in the display area the barrier image separated by the virtual distance from the avatar image, if the virtual distance is shorter than the predetermined distance limit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
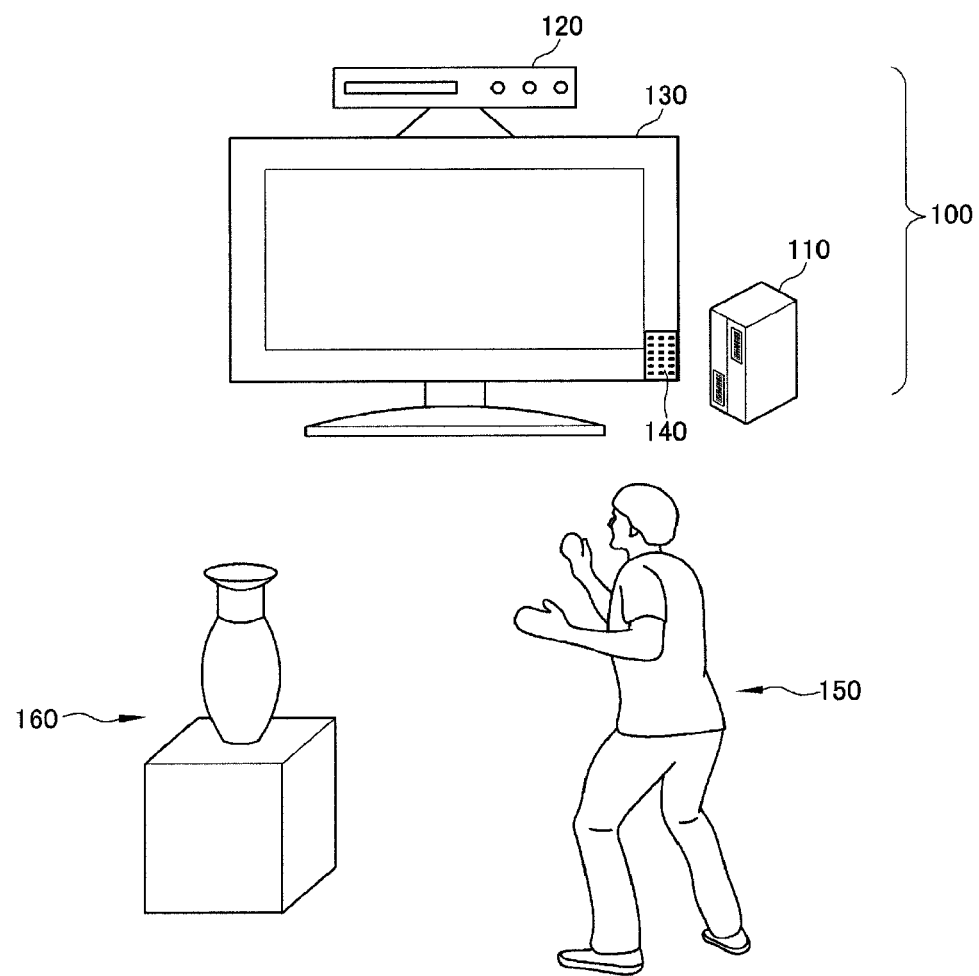
FIG. 1 schematically shows an illustrative example of an environment where a player interacts with a gesture-based game system in the vicinity of an obstacle.

The depicted embodiments are all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a safety scheme for gesture-based game systems.

Briefly stated, technologies are generally described for a gesture-based game system configured to provide in a display area a barrier image associated with an obstacle within a playing space associated with a gesture-based game being currently played on the gesture-based game system. In some examples, the gesture-based game system may generate the barrier image so that the player cannot move over the barrier image. In some examples, the barrier image may help to limit the movement of the player, so as to prevent or avoid the collision between the player and the obstacle.

In some examples, the gesture-based game system may generate the barrier image based at least in part on the physical locations of the player and the obstacle in the playing space. In such cases, the gesture-based game system may determine the location of the barrier image in the display area based at least in part on the physical locations of the player and the obstacle and/or the distance between the player and the obstacle.

In some examples, the gesture-based game system may generate an avatar image associated with the player, as well as the barrier image. In some examples, the barrier image may limit the movement of the avatar image, that is, act as a boundary or borderline for the movement of the avatar image, so as to prevent or avoid the collision between the player and the obstacle.

In some examples, the gesture-based game system may generate the avatar image and the barrier image based at least in part on the physical locations of the player and the obstacle in the playing space. In such cases, the gesture-based game system may determine the locations of the avatar image and the barrier image in the display area based at least in part on the physical locations of the player and the obstacle and/or the distance between the player and the obstacle. In some examples, the gesture-based game system may determine a virtual distance between the avatar image and the barrier image based at least in part on the distance between the player and the obstacle, and locate the barrier image separated by the virtual distance from the avatar image in the display area.

In some examples, the player may install or place an object in the playing space, so that the object may act as an obstacle in the gesture-based game. In such cases, the obstacle may be used for adjusting a difficulty level of the game. For example, in a shooting game, the range of movement for the avatar image may be reduced due to the obstacle, and thus the player may have difficulty controlling the avatar image in the game. Alternatively, the obstacle may be used as a part of the game. For example, the player may use the obstacle by riding over the obstacle in a skateboarding game, or the player may hide himself/herself behind the obstacle in a shooting game.

FIG. 1 schematically shows an illustrative example of an environment where a player interacts with a gesture-based game in the vicinity of an obstacle, in accordance with at least some embodiments described herein. As depicted in FIG. 1, a player 150 may play a gesture-based game using a gesture-based game system 100. The gesture-based game may be played by having camera 120 recognize gestures made by player 150, which serve as player input. By way of example, but not limitation, gesture-based games played on system 100 may include a shooting game such as a first-person shooter game, dancing, racing, extreme sports (such as skateboarding, snowboarding, motocross, etc.), boxing game, or golf.

In some embodiments, gesture-based game system 100 may include a game console 110, a camera 120, a display 130 and an audio device 140. Game console 110 may facilitate execution of a gesture-based game. Although illustrated as discrete components, various components of gesture-based game system 100 may be divided into additional components, combined into fewer components, or eliminated altogether, depending on the desired implementation. For example, camera 120 may be included as a component of the game console 110.

Game console 110 may be configured to run or execute the gesture-based game. By way of example, but not limitation, when player 150 inserts a game, such as, but not limited to, a compact disk (CD) or a game digital versatile disk (DVD), of the gesture-based game into game console 110, game console 110 may start executing the gesture-based game. In some embodiments, gesture-based game system 100 may be connected to a cloud game server or a component of a cloud game system, and game console 110 may run or execute the gesture-based game provided by the cloud game server or the cloud game system.

Camera 120 may be configured to capture, detect, and/or recognize a person within a predetermined detectable area (e.g., field of view of camera 120) and recognize the person as player 150 of the game run or executed by game console 110. Camera 120 may be further configured to capture, detect, and/or recognize an obstacle 160 within a playing space associated with the game run or executed by game console 110. Camera 120 may be one of a set of input devices associated with gesture-based game system 100. In some embodiments, camera 120 may detect a movement of player 150 and transmit the detected movement, as an electrical signal, to game console 110. By way of example and not limitation, camera 120 may be capable of determining gesture depth, facial feature recognition, gesture recognition, and may further include a microphone for audio and/or voice recognition. Accordingly, camera 120 may include a wide variety of imaging devices which may have the capability of recognizing player 150 and/or recognizing his/her gestures, and so forth.

Display 130 may be configured to display the gesture-based game run or executed by game console 110. In some embodiments, display 130 may display an avatar image that is associated with player 150. In some embodiments, display 130 may also display a barrier image that is associated with obstacle 160, so as to aid in reducing the risk of collision between player 150 and obstacle 160 during playing the gesture-based game, in accordance with various embodiments. In some embodiments, game console 110 may determine whether obstacle 160 exists within a playing space associated with a game being currently played by player 150 based at least in part on the images captured, detected, and/or recognized by camera 120, and further instruct display 130 to display the barrier image based at least in part on the determination. By way of example, display 130 may include, but is not limited to, a liquid crystal display (LCD), a plasma display panel (PDP), a light emitting diode (LED) backlight display device, or other display device.

Audio device 140 is one of a set of output devices of gesture-based game system 100. Audio device 140 may output background music or sound effects of the gesture-based game as the game proceeds. Audio device 140 may be provided as a part of display 130 as shown in FIG. 1 or as a separate device.

Figure 2:
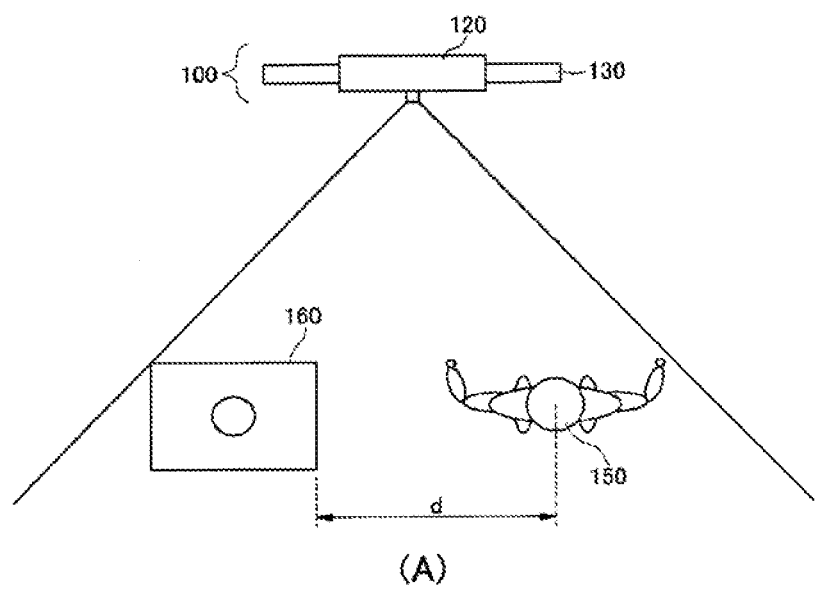
FIG. 2(A) schematically shows an illustrative example of an environment where a player interacts with a gesture-based game system in the vicinity of an obstacle.
FIG. 2(B) schematically shows an illustrative example of a display area in cases where a player interacts with a gesture-based game system in the vicinity of an obstacle as in FIG. 2(A)
Figure 2:
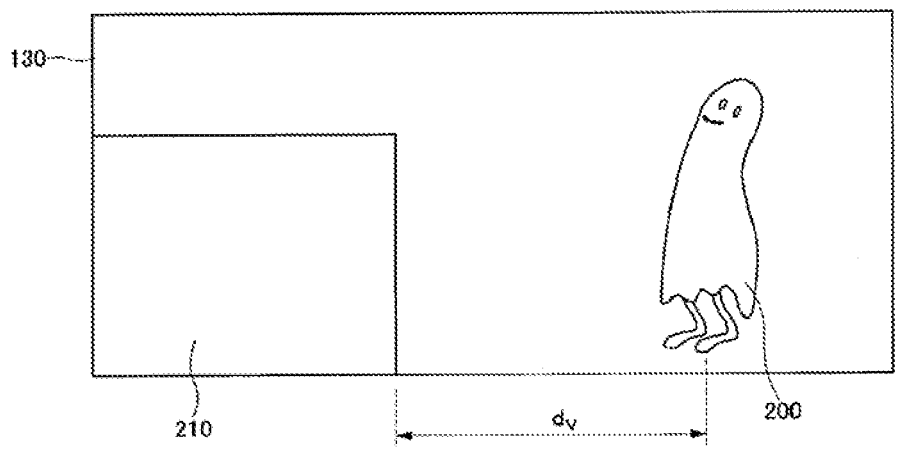

FIG. 2(A) schematically shows an illustrative example of an environment where a player interacts with a gesture-based game system in the vicinity of an obstacle in accordance with at least some embodiments described herein. FIG. 2(B) schematically shows an illustrative example of a display area in cases where a player interacts with a gesture-based game system in the vicinity of an obstacle as in FIG. 2(A) in accordance with at least some embodiments described herein. Although FIGS. 2(A)-(B) illustrate one player interacting with gesture-based game system 100, it should be appreciated by one skilled in the relevant art that two or more players may interact with the gesture-based game system 100 at the same time.

As depicted in FIG. 2(A), player 150 may interact with gesture-based game system 100, by playing a certain game, and obstacle 160 may be located within a playing space associated with the game played by player 150. Camera 120 may capture, detect, and/or recognize images of player 150 and obstacle 160, and gesture-based game system 100 may determine a location of player 150 and a location of obstacle 160 in the playing space based at least in part on the captured image. In some embodiments, gesture-based game system 100 may display an avatar image 200 and a barrier image 210 on display 130 based at least in part on the determined locations of player 150 and obstacle 160. In some embodiments, barrier image 210 may be immovable during playing of the game by player 150. Although FIG. 2(B) illustrates avatar image 200 in human form or as an animate object, it should be appreciated by one skilled in the relevant art that any images, such as, for example, a rifle image in case of a first-person shooter game or some other inanimate object, may be displayed instead of a human-shaped image. Also, it is possible to display game scenes (and a barrier image, if necessary) without displaying avatar image 200.

In some embodiments, gesture-based game system 100 may determine a distance d between player 150 and obstacle 160 based at least in part on the determined locations of player 150 and obstacle 160 in the playing space. In some embodiments, gesture-based game system 100 may determine a virtual distance $d_v$ between avatar image 200 and barrier image 210 based at least in part on distance d between player 150 and obstacle 160 on the display. In some embodiments, gesture-based game system 100 may locate barrier image 210 on display 130 separated by virtual distance $d_v$ from avatar image 200.

By way of example, but not limitation, virtual distance $d_v$ between avatar image 200 and barrier image 210 may be in proportion to distance d between player 150 and obstacle 160. Further, the ratio between virtual distance $d_v$ and distance d may vary depending on the game played on gesture-based game system 100. In some embodiments, gesture-based game system 100 may determine virtual distance $d_v$ based on a predetermined safety margin, as well as distance d between player 150 and obstacle 160. As a non-limiting example of establishing the safety margin, gesture-based game system 100 may set virtual distance $d_v$ to be less than an exact value proportional to distance d between player 150 and obstacle 160. The safety margin may vary depending on the game being played on gesture-based game system 100.

Figure 3:
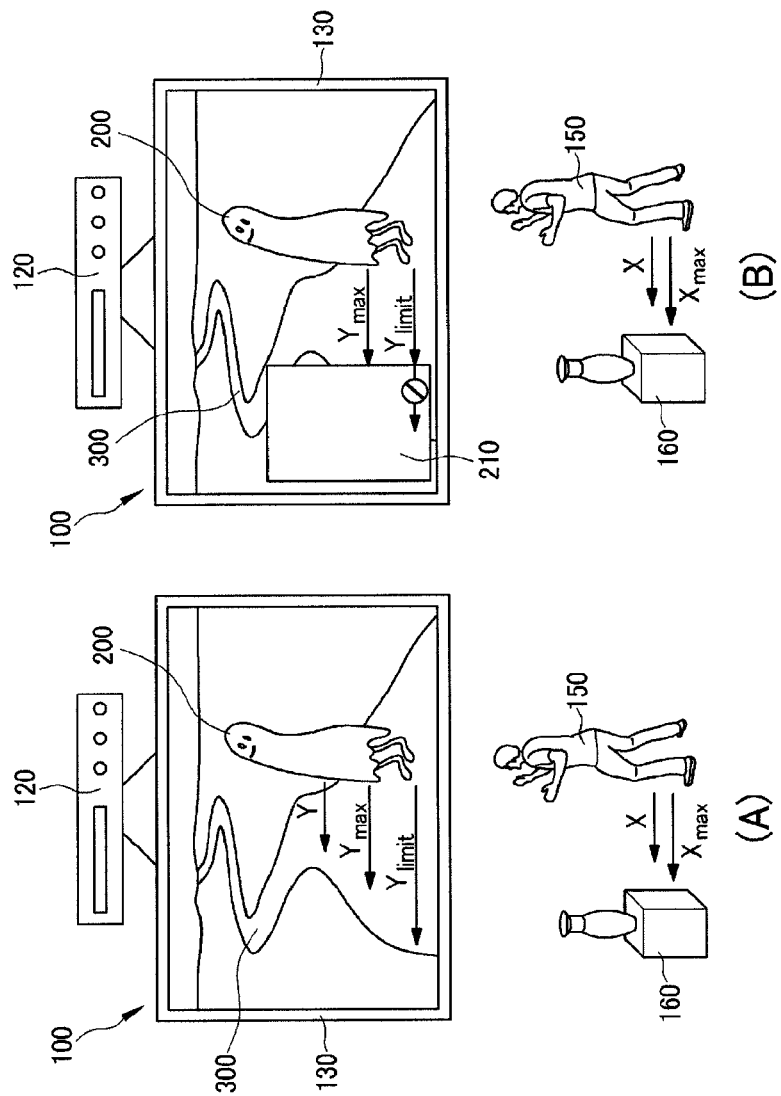
FIG. 3(A)-(B) schematically show an illustrative example of an environment where a player interacts with a gesture-based game system in the vicinity of an obstacle.

FIGS. 3(A)-(B) schematically show an illustrative example of an environment where a player interacts with a gesture-based game system in the vicinity of an obstacle in accordance with at least some embodiments described herein. Although FIGS. 3(A)-(B) illustrate one player interacting with gesture-based game system 100, it should be appreciated by one skilled in the relevant art that two or more of players may interact with the gesture-based game system at the same time.

As depicted in FIGS. 3(A)-(B), player 150 may interact with gesture-based game system 100, by playing a certain game, and obstacle 160 may be located within a playing space associated with the game played by player 150. Camera 120 may capture, recognize, and/or detect an image of player 150 and obstacle 160, and gesture-based game system 100 may determine a location of player 150 and a location of obstacle 160 in the playing space based at least in part on the captured image. In some embodiments, gesture-based game system 100 may display avatar image 200 on display 130 based at least in part on the determined location of player 150. Although FIGS. 3(A)-(B) illustrate avatar image 200 in human form or as an animate object, it should be appreciated by one skilled in the relevant art that any other inanimate images may be presented instead of a human-shaped image.

In some embodiments, gesture-based game system 100 may estimate or determine a maximum distance over which player 150 may move freely without bumping into obstacle 160. By way of example, but not limitation, player 150 can move a maximum distance $X_{max}$ in one dimensional space.

In some embodiments, maximum distance $X_{max}$ may be the distance between player 150 and obstacle 160. Accordingly, gesture-based game system 100 may determine maximum distance $X_{max}$, with a safety margin taken into consideration. In such cases, gesture-based game system 100 may determine maximum distance $X_{max}$ by determining the distance between player 150 and obstacle 160 and subtracting the safety margin from the distance between player 150 and obstacle 160. By way of example, but not limitation, the safety margin may vary depending on the game being played on gesture-based game system 100.

In some embodiments, gesture-based game system 100 may estimate or determine a maximum virtual distance $Y_{max}$ over which avatar image 200 may move in a display area based at least in part on the determined maximum distance $X_{max}$. In some embodiments, maximum virtual distance $Y_{max}$ may be in proportion to maximum distance $X_{max}$. By way of example, but not limitation, the ratio between maximum virtual distance $Y_{max}$ and maximum distance $X_{max}$ may vary depending on the game played on gesture-based game system 100.

In some embodiments, gesture-based game system 100 may compare maximum virtual distance $Y_{max}$ with a predetermined distance limit $Y_{limit}$, which may set a boundary or borderline for the movement of avatar image 200. By way of example, but not limitation, a predetermined distance limit $Y_{limit}$ may vary depending on the game being played on gesture-based game system 100. For example, in an example game illustrated in FIGS. 3(A)-(B), avatar image 200 may move along road 300 in the display area, that is, player 150 may make gestures so as not to stray from road 300 in the display area. In such cases, distance limit $Y_{limit}$ may be associated with, for example, the shape, width, etc. of road 300.

In cases for which maximum virtual distance $Y_{max}$ is longer than or equal to distance limit $Y_{limit}$, player 150 may be unlikely to bump into obstacle 160 during the playing of the game, since avatar image 200 associated with player 150 may move within distance limit $Y_{limit}$. On the other hand, in cases for which maximum virtual distance $Y_{max}$ is shorter than distance limit $Y_{limit}$, as illustrated in FIG. 3(A), player 150 may possibly bump into obstacle 160 during the playing of the game. In some embodiments, gesture-based game system 100 may generate or display on display 130 barrier image 210 as illustrated in FIG. 3(B). In such cases, displayed barrier image 210 may limit the movement of avatar image 200, that is, act as a new boundary or borderline for the movement of avatar image 200, so as to prevent or avoid the collision between player 150 and obstacle 160. As non-limiting examples, barrier image 210 may include a tree image, a wall image or a rock image.

Although FIGS. 3(A)-(B) illustrate that player 150 and avatar image 200 move in one dimensional space for ease of explanation, it should be appreciated by one skilled in the relevant art that player 150 and avatar image 200 may move in three dimensional space. That is, the above process for preventing the collision between player 150 and obstacle 160 may also be performed in backward and/or forward directions or in upward and/or downward directions, as well as in right and/or left directions.

Figure 4:
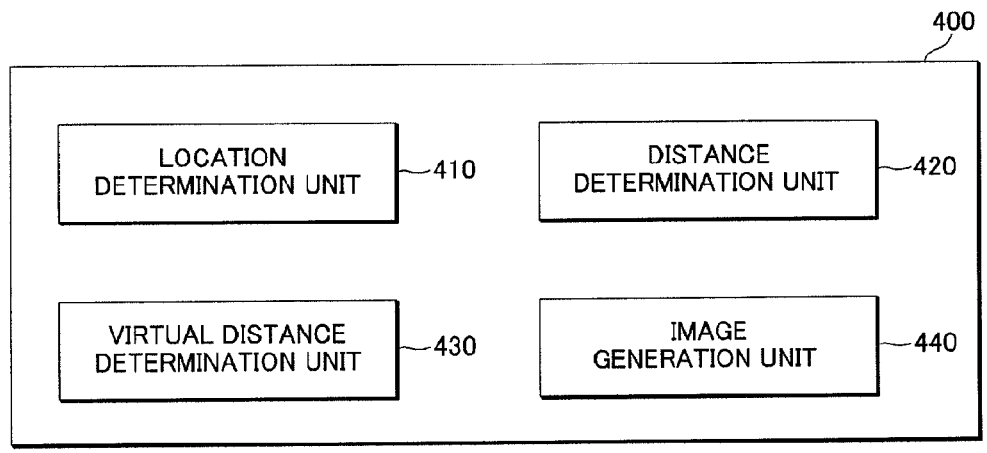
FIG. 4 shows a schematic block diagram illustrating an example architecture for providing a safety scheme for a gesture-based game system.

FIG. 4 shows a schematic block diagram illustrating an example architecture for providing a safety scheme for a gesture-based game system in accordance with at least some embodiments described herein. As depicted, gesture-based game system 400 may include a location determination unit 410, a distance determination unit 420, a virtual distance determination unit 430 and an image generation unit 440. Although illustrated as discrete components, various components may be divided into additional components, combined into fewer components, or eliminated altogether while being contemplated within the scope of the disclosed subject matter.

Location determination unit 410 may be configured to obtain player location information of a player and obstacle location information of an obstacle in a playing space during playing of a game using gesture-based game system 400. In some embodiments, location determination unit 410 may obtain the player location information and the obstacle location information based at least in part on the image of the player and the obstacle captured by a camera (not shown).

Distance determination unit 420 may be configured to determine a distance between the player and the obstacle in the playing space. In some embodiments, distance determination unit 420 may determine the distance between the player and the obstacle based at least in part on the player location information and the obstacle location information obtained by location determination unit 410.

Virtual distance determination unit 430 may be configured to determine in a display area a virtual distance between an avatar image associated with the player and a barrier image associated with the obstacle. In some embodiments, virtual distance determination unit 430 may determine the virtual distance based at least in part on the distance between the player and the obstacle in the playing space, as determined by distance determination unit 420. For example, virtual distance determination unit 430 may determine the virtual distance to be in proportion to the distance between the player and the obstacle in the playing space, as determined by distance determination unit 420. By way of example, but not limitation, the ratio between the virtual distance and the distance may vary depending on the game played on gesture-based game system 400. In some embodiments, virtual distance determination unit 430 may determine the virtual distance based at least in part on the determined distance received from distance determination unit 420 and a predetermined safety margin. Thus, the predetermined safety margin may vary depending on the game played on gesture-based game system 400.

Image generation unit 440 may be configured to generate in the display area the avatar image and the barrier image, separated from each other by the virtual distance. In some embodiments, image generation unit 440 may generate the barrier image in the display area, if the virtual distance determined by virtual distance determination unit 430 is shorter than a predetermined distance limit. Thus, the predetermined distance limit may vary depending on the game played on gesture-based game system 400.

Figure 5:
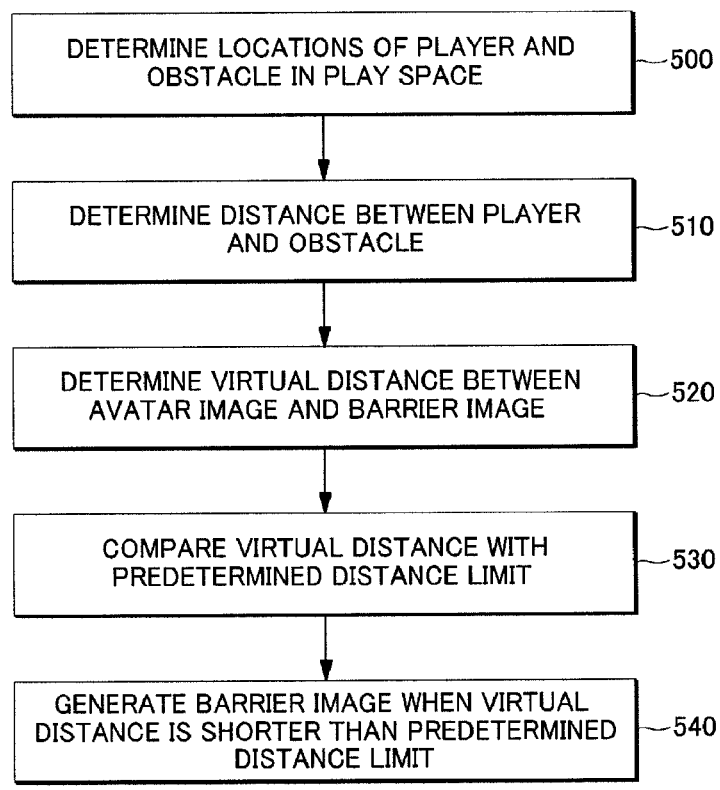
FIG. 5 shows an example flow diagram of a process for providing a safety scheme for a gesture-based game system.

FIG. 5 shows an example flow diagram of a process for providing a safety scheme for a gesture-based game system, in accordance with at least some embodiments described herein. The method in FIG. 5 may be implemented in a gesture-based game system including location determination unit 410, distance determination unit 420, virtual distance determination unit 430 and image generation unit 440 discussed above. An example process may include one or more operations, actions, or functions as illustrated by one or more blocks 500, 510, 520, 530 and/or 540. Although illustrated as discrete blocks, various blocks may be divided into additional blocks, combined into fewer blocks, or eliminated, depending on the desired implementation. Processing may begin at block 500.

At block 500, the gesture-based game system may determine locations of a player and an obstacle in a playing space associated with a game being currently played on the gesture-based game system. In some embodiments, the gesture-based game system may determine the locations of the player and the obstacle based at least in part on the image of the player and the obstacle captured by using a camera, which may be a component of the gesture-based game system. Processing may continue from block 500 to block 510.

At block 510, the gesture-based game system may determine a distance between the player and the obstacle in the playing space. In some embodiments, the gesture-based game system may determine the distance based at least in part on the determined locations of the player and the obstacle. Processing may continue from block 510 to block 520.

At block 520, the gesture-based game system may determine a virtual distance between an avatar image associated with the player and a barrier image associated with the obstacle. In some embodiments, the gesture-based game system may determine the virtual distance based at least in part on the distance between the player and the obstacle in the playing space. For example, the gesture-based game system may determine the virtual distance in proportion to the distance between the player and the obstacle. Further, the ratio between the virtual distance and the distance may vary depending on the game played on the gesture-based game system. In some embodiments, the gesture-based game system may determine the virtual distance based at least in part on a predetermined safety margin, as well as the distance between the player and the obstacle. By way of example, but not limitation, the predetermined safety margin may vary depending on the game played on the gesture-based game system. Processing may continue from block 520 to block 530.

At block 530, the gesture-based game system may compare the virtual distance with a predetermined distance limit. By way of example, but not limitation, the predetermined distance limit may vary depending on the game played on the gesture-based game system. Processing may continue from block 530 to block 540.

At block 540, the gesture-based game system may generate in a display area associated with the game the barrier image when the virtual distance is shorter than the predetermined distance limit. In some embodiments, the gesture-based game system may locate the barrier image separated by the virtual distance from the avatar image. The barrier image may limit the movement of the avatar image, that is, act as a new boundary or borderline for the movement of the avatar image, so as to prevent or avoid the collision between the player and the obstacle.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
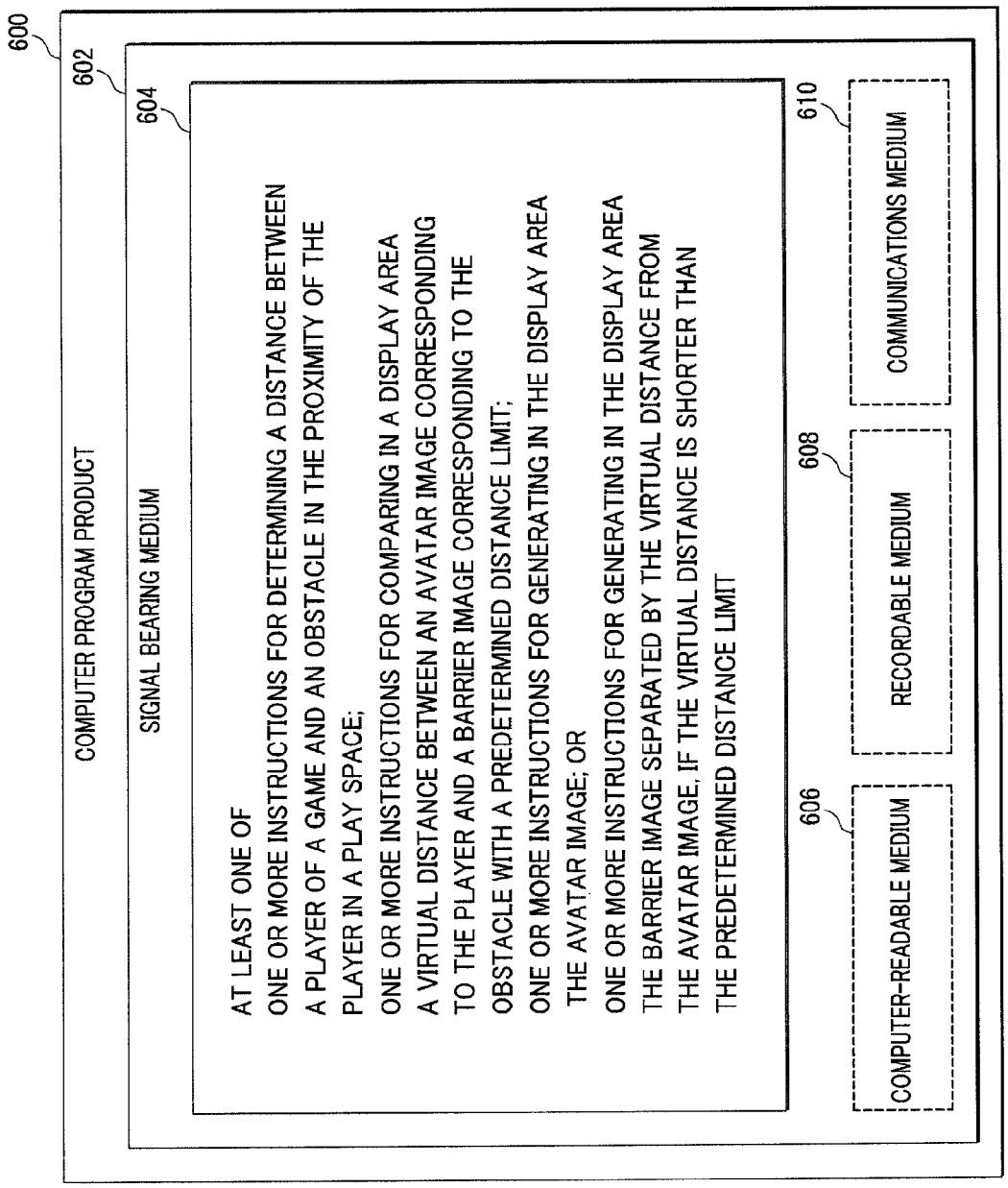
FIG. 6 illustrates computer program products that can be utilized to provide a safety scheme for a gesture-based game system.

FIG. 6 illustrates computer program products 600 that may be utilized to provide a safety scheme for a gesture-based game system in accordance with at least some embodiments described herein. Program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for determining a distance between a player of a game and an obstacle in the proximity of the player in a playing space; one or more instructions for comparing in a display area a virtual distance between an avatar image corresponding to the player and a barrier image corresponding to the obstacle with a predetermined distance limit; one or more instructions for generating in the display area the avatar image; one or more instructions for generating in the display area the barrier image separated by the virtual distance from the avatar image, if the virtual distance is shorter than the predetermined distance limit. Thus, for example, referring to FIG. 4, gesture-based game system 400 may undertake one or more of the blocks shown in FIG. 5 in response to instructions 604.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of gesture-based game system 400 by an RF signal bearing medium 602, where the signal bearing medium 602 is conveyed by a wireless communications medium 610 (e.g., a wireless communications medium conforming with the IEEE 802.11 standard). In some implementations, program product 600 may be executed on a cloud game server or a component of a cloud game system, both of which may be communicatively coupled to gesture-based game system 400.

Figure 7:
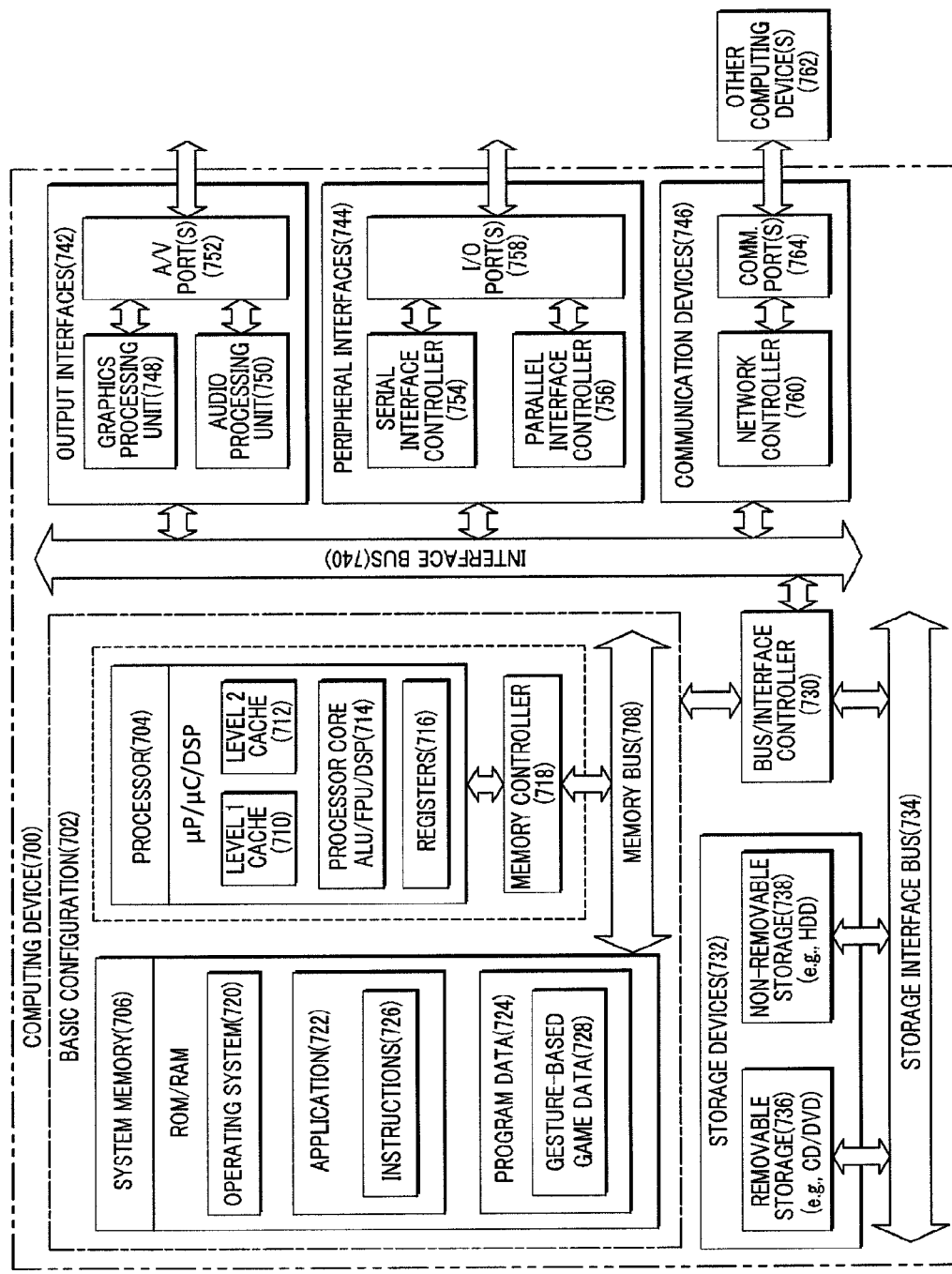
FIG. 7 is a block diagram illustrating an example computing device that can be utilized to provide a safety scheme for a gesture-based game system.

FIG. 7 is a block diagram illustrating an example computing device 700 that can be utilized to provide a safety scheme for a gesture-based game system in accordance with at least some embodiments described herein. In these examples, elements of computing device 700 may be arranged or configured for a gesture-based game system. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include instructions 726 that may be arranged to perform the functions as described herein including the actions described with respect to the gesture-based game system 400 architecture as shown in FIG. 4 or including the actions described with respect to the flow charts shown in FIG. 5. Program data 724 may include gesture-based game data 728 that may be utilized for implementing instructions 726 (e.g., barrier image generation). In some examples, application 722 may be arranged to operate with program data 724 on an operating system 720 such that implementations for instructions for a gesture-based game system as described herein.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method, comprising:
   determining a location of a player and an obstacle in a playing space;
   generating, in a display area, an avatar image associated with the player in the playing space;
   generating a barrier image associated with the obstacle;

determining a distance between the player and the obstacle based at least in part on the determined location of the player and the obstacle,
  wherein the determining the distance includes subtracting a predetermined safety margin from the distance, and
  wherein the predetermined safety margin varies depending on a game;
determining a virtual distance between the avatar image and the barrier image based at least in part on the determined distance between the player and the obstacle;
comparing the determined virtual distance with a predetermined distance limit; and
in response to the determined virtual distance being less than or equal to the predetermined distance limit, displaying in the display area the barrier image associated with an obstacle.

2. The method of claim 1, wherein the determining the virtual distance includes determining the virtual distance in proportion to the determined distance between the player and the obstacle.

3. The method of claim 2, wherein a ratio between the determined virtual distance and the determined distance between the player and the obstacle varies depending on a game.

4. The method of claim 1, wherein the barrier image is immovable during gameplay.

5. The method of claim 1, further comprising displaying the barrier image on a display device.

6. A gesture-based game system, comprising:
  a location determination unit configured to obtain player location information of a player and obstacle location information of an obstacle in a playing space;
  a distance determination unit configured to determine a distance between the player and the obstacle based at least in part on the obtained player location information and the obtained obstacle location information;
  a virtual distance determination unit configured to determine a virtual distance between an avatar image associated with the player and a barrier image associated with the obstacle,
    wherein the virtual distance is proportional to the determined distance between the player and the obstacle, and
    wherein a ratio between the virtual distance and the distance varies depending on a game; and
  an image generation unit configured to:
    generate the avatar image in a display area, and
    in response to the virtual distance being less than or equal to a predetermined distance limit, generate the barrier image in the display area separated from the avatar image by the determined virtual distance.

7. The gesture-based game system of claim 6, wherein the virtual distance determination unit is further configured to determine the virtual distance between the avatar image and the barrier image in proportion to the determined distance between the player and the obstacle.

8. The gesture-based game system of claim 7, wherein a ratio between the virtual distance and the distance varies depending on a game.

9. The gesture-based game system of claim 6, wherein the determined distance includes subtracting a predetermined safety margin from the determined distance.

10. The gesture-based game system of claim 9, wherein the predetermined safety margin varies depending on a game.

11. A non-transitory computer-readable storage medium having stored thereon computer-executable instructions that, in response to execution, cause a gesture-based game system to perform operations, comprising:
  determining a distance between a player and an obstacle in a playing space;
  comparing a virtual distance, based on the determined distance, between an avatar image corresponding to the player and a barrier image corresponding to the obstacle with a predetermined distance limit, wherein the predetermined distance limit varies depending on a game;
  generating the avatar image in a display area; and
  in response to the virtual distance being less than or equal to the predetermined distance limit, generating in the display area the barrier image separated from the avatar image by the virtual distance.

12. The non-transitory computer-readable medium of claim 11, wherein the barrier image is immovable during gameplay.

13. The non-transitory computer-readable storage medium of claim 11, wherein the determining the virtual distance includes determining the virtual distance in proportion to the distance between the player and the obstacle.

14. The non-transitory computer-readable storage medium of claim 11, wherein the determining the distance includes subtracting a predetermined safety margin from the distance.

15. The non-transitory computer-readable storage medium of claim 14, wherein the predetermined safety margin varies depending on a game.

* * * * *